United States Patent
Lee

(10) Patent No.: US 6,226,050 B1
(45) Date of Patent: May 1, 2001

(54) SIGNAL ADAPTIVE FILTERING METHOD FOR REDUCING RINGING NOISE AND SIGNAL ADAPTIVE FILTER

(75) Inventor: Yung-lyul Lee, Seoul (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/054,407

(22) Filed: Apr. 3, 1998

(30) Foreign Application Priority Data

Apr. 4, 1997 (KR) .................................................. 97-12498

(51) Int. Cl.$^7$ ....................................................... H04N 5/21
(52) U.S. Cl. ......................... 348/607; 348/625; 382/268; 382/199; 382/205
(58) Field of Search ................................... 348/606, 607, 348/625, 628, 624, 629, 630; 382/260, 266, 262, 268, 269, 272, 273, 205, 199, 270, 261, 265, 206; H04N 5/21

(56) References Cited

U.S. PATENT DOCUMENTS

| | | | |
|---|---|---|---|
| 5,883,983 | * | 3/1999 | Lee ........................................ 382/268 |
| 5,974,197 | * | 10/1999 | Lee ........................................ 382/268 |

FOREIGN PATENT DOCUMENTS

| | | | |
|---|---|---|---|
| 3-263977 | 11/1991 | (JP) | ................................. H04N/5/208 |
| 4-20182 | 1/1992 | (JP) | ................................. H04N/5/21 |
| 4-42682 | 2/1992 | (JP) | ................................. H04N/5/93 |
| 4-159869 | 6/1992 | (JP) | ................................. H04N/5/21 |
| 6-105188 | 4/1994 | (JP) | ................................. H04N/5/21 |
| 6-260889 | 9/1994 | (JP) | ................................. H03H/17/02 |
| 6-315104 | 11/1994 | (JP) | ................................. H04N/5/21 |

* cited by examiner

Primary Examiner—Sherrie Hsia
(74) Attorney, Agent, or Firm—Sughrue, Mion, Zinn Macpeak & Seas, PLLC

(57) ABSTRACT

A gradient is calculated at each pixel of the image data to be filtered using a one-dimensional horizontal gradient operator of 1×2 size and a one-dimensional vertical gradient operator of 2×1 size, each of the gradient operators having a weighted value (1,−1). The absolute value of the calculated gradient is then compared with a predetermined threshold value to generate a binary value. This gradient calculation and comparison with a threshold is repeated for pixel blocks having a predetermined size to generate a binary edge map with respect to a whole block. A filter window of a predetermined size is then applied to the generated binary edge map to determine whether edges are present in the filter window. If no edges are present in the filter window, then the pixel values of the corresponding filter window pixel are filtered pixel-by-pixel by using a predetermined first set of weighted values to generate a new pixel value. On the other hand, if edges are present in the filter window, then (subject to an exception) the pixel values of the corresponding filter window are filtered pixel-by-pixel by using a predetermined second set of weighted values to generate a new pixel value. The exception is that no filtering is performed if the pixel located at the center of the filter window represents an edge. As a result of this processing, ringing noise is removed from a block-based processed image, enhancing the quality of the decompressed image.

5 Claims, 4 Drawing Sheets

FIG. 3A
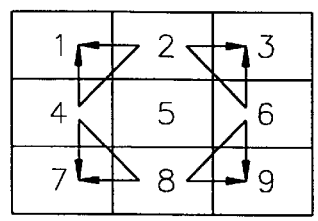
FIG. 3B
| 1 | 2 | 1 |
| --- | --- | --- |
| 2 | 4 | 2 |
| 1 | 2 | 1 |
FIG. 3C
| 1 | 1 | 1 |
| --- | --- | --- |
| 1 | 2 | 1 |
| 1 | 1 | 1 |
FIG. 4
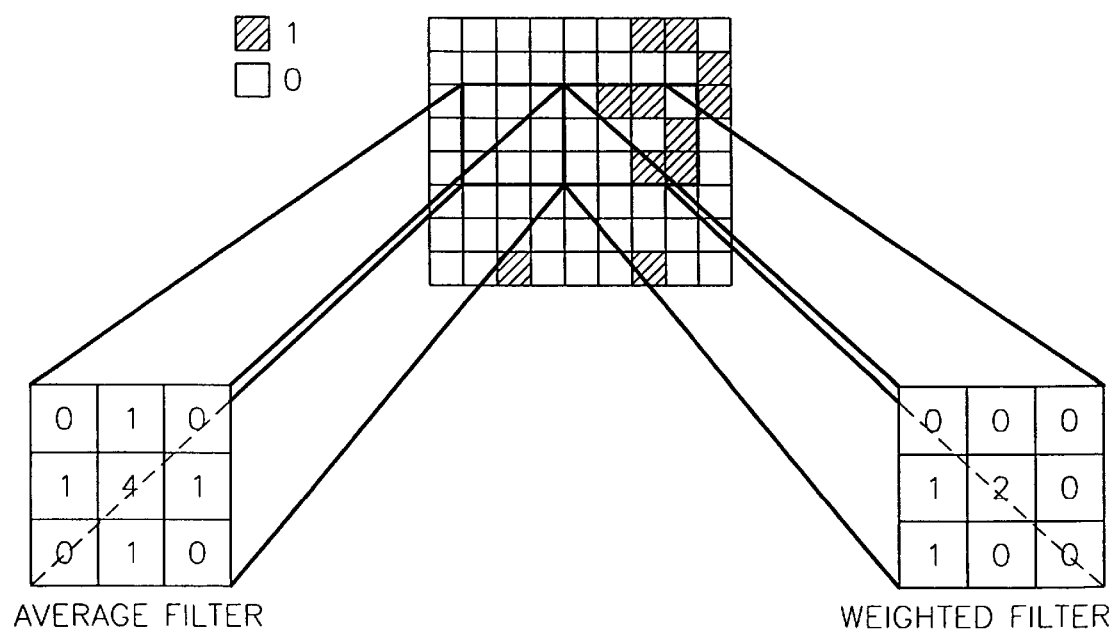

SIGNAL ADAPTIVE FILTERING METHOD FOR REDUCING RINGING NOISE AND SIGNAL ADAPTIVE FILTER

BACKGROUND OF THE INVENTION

1. Field of the Invention

The present invention relates to data filtering, and more particularly, to a signal adaptive filtering method for reducing ringing noise, and a signal adaptive filter suitable for implementing the method. This application for a signal adaptive filtering method and signal adaptive filter for reducing ringing noise is based upon Korean Patent Application No. 97-12498 which is incorporated herein by reference for all purposes.

2. Description of the Related Arts

Generally, picture encoding standards such as MPEG of the International Organization for Standardization (ISO) and H.263 recommended by the International Telecommunication Union (ITU) adopt block-based motion estimation and discrete cosine transform (DCT) of blocks. When an image is highly compressed, the block-based coding may cause a blocking effect and ringing noise. A typical blocking effect is grid noise in a homogeneous area in which adjacent pixels have relatively similar pixel values. Another blocking effect is staircase noise which has the shape of a staircase and is generated along the edge of the image. Also, the ringing noise is due to the typical Gibb's phenomenon which results from the truncation of a DCT coefficient by quantization when the image is highly compressed. The ringing noise causes a problem in that an object in the image is displayed as multiple overlapping objects.

SUMMARY OF THE INVENTION

To solve the problems above, it is an object of the present invention to provide a signal adaptive filtering method for reducing the ringing noise in a high compression encoding system, caused when block-based decoding an image data, and a signal adaptive filter for implementing the method.

According to an aspect of the present invention, there is provided a signal adaptive filtering method for reducing ringing noise of an image data, comprising the steps of:

(a) calculating a gradient of the image data to be filtered at each pixel using a one-dimensional horizontal gradient operator of 1×2 size and a one-dimensional vertical gradient operator of 2×1 size, both having a weighted value (1,−1), and comparing the absolute value of the calculated gradient with a predetermined threshold value to generate a binary value;

(b) repeating the step (a) on a pixel block having a predetermined size by a pixel unit to generate a binary edge map with respect to the whole block;

(c) applying a filter window of a predetermined size to the generated binary edge map to determine whether edges are present in the filter window;

(d) filtering the pixel values of the corresponding filter window pixel by pixel by using predetermined first weighted values to generate a new pixel value if it is determined in said step (c) that edges are not present; and (e) filtering the pixel values of the corresponding filter window pixel by pixel by using predetermined second weighted values to generate a new pixel value if it is determined in said step (c) that edges are present, wherein the filtering is not performed if the pixel located at the center of the filter window represents an edge.

Preferably, the step (a) comprises the sub-steps of:

(a1) initializing upper and left pixels of the filtering target pixel block to information (0) meaning a non-edge;

(a2) comparing the absolute value of the gradient with respect to each pixel of the image with the predetermined threshold value; and (a3) determining the corresponding pixel and adjacent pixel (right pixel when using the horizontal gradient operator, and lower pixel when using the vertical gradient operator) as edge if the absolute value is greater than the threshold value, and as non-edge if the absolute value is less than or equal to the threshold value, to generate the binary value.

According to another aspect of the present invention, a signal adaptive filter is provided which has an image storing unit for temporarily storing decompressed image data and a gradient operation unit for receiving the image data from the image storing unit and calculating a gradient of the image data in the horizontal and vertical directions by a one-dimensional horizontal gradient operator of 1×2 size and a one-dimensional vertical gradient operator of 2×1 size, both having a weighted value (1,−1). The filter also has a binary edge map generator for comparing the absolute value of each result in pixel units, which is gradient-operated in horizontal and vertical directions by the gradient operation unit, with a predetermined threshold value to generate a binary edge map. The filter also has a filter selector for storing the binary edge map provided from the binary edge map generator, and for classifying the input image data into one of an edge area including at least one edge information and a homogeneous area without having edge information, based on the binary edge map. The filter also has an average filter for average-filtering pixel of the filter window, determined as the homogeneous area by the filter selector, to generate a new pixel value, and a weighted filter for weight-filtering pixels of the filter window using a predetermined weighted value, determined as the edge area by the filter selector, to generate a new pixel value.

BRIEF DESCRIPTION OF THE DRAWINGS

The above object and advantages of the present invention will become more apparent by describing in detail preferred embodiments thereof with reference to the attached drawings in which:

FIG. 3A illustrates a filtering window for a 2-dimensional 3×3 filter;

FIGS. 3B and 3C are diagrams showing weights for a 3×3 average filter and a 3×3 weighted filter;

FIG. 4 is a diagram showing an example of a two-dimensional signal adaptive filter in a 3×3 size.

DETAILED DESCRIPTION OF THE PREFERRED EMBODIMENTS

Figure 1:
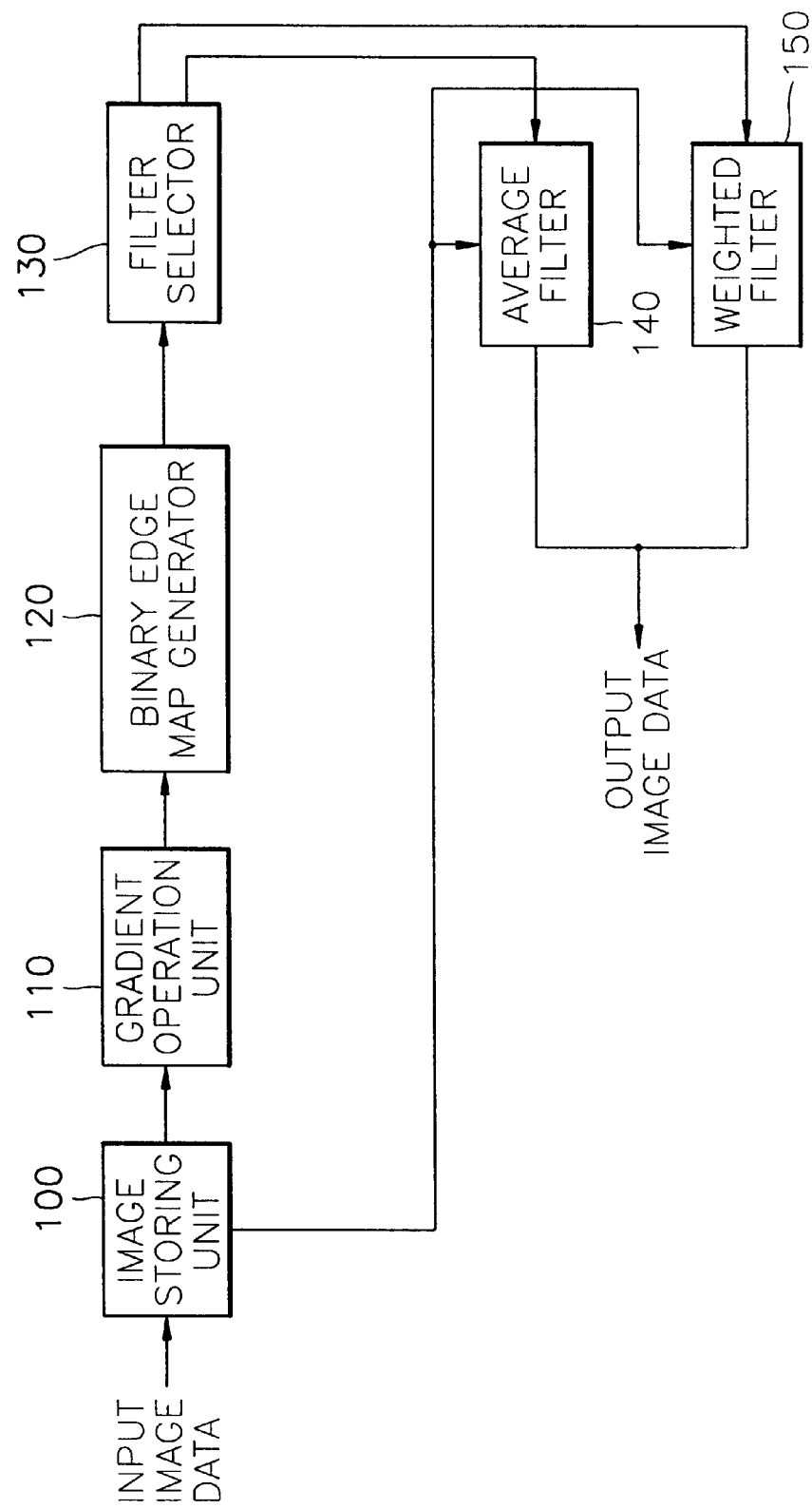
FIG. 1 is a block diagram showing the structure of a signal adaptive filter according to a preferred embodiment of the present invention.
Figure 5:
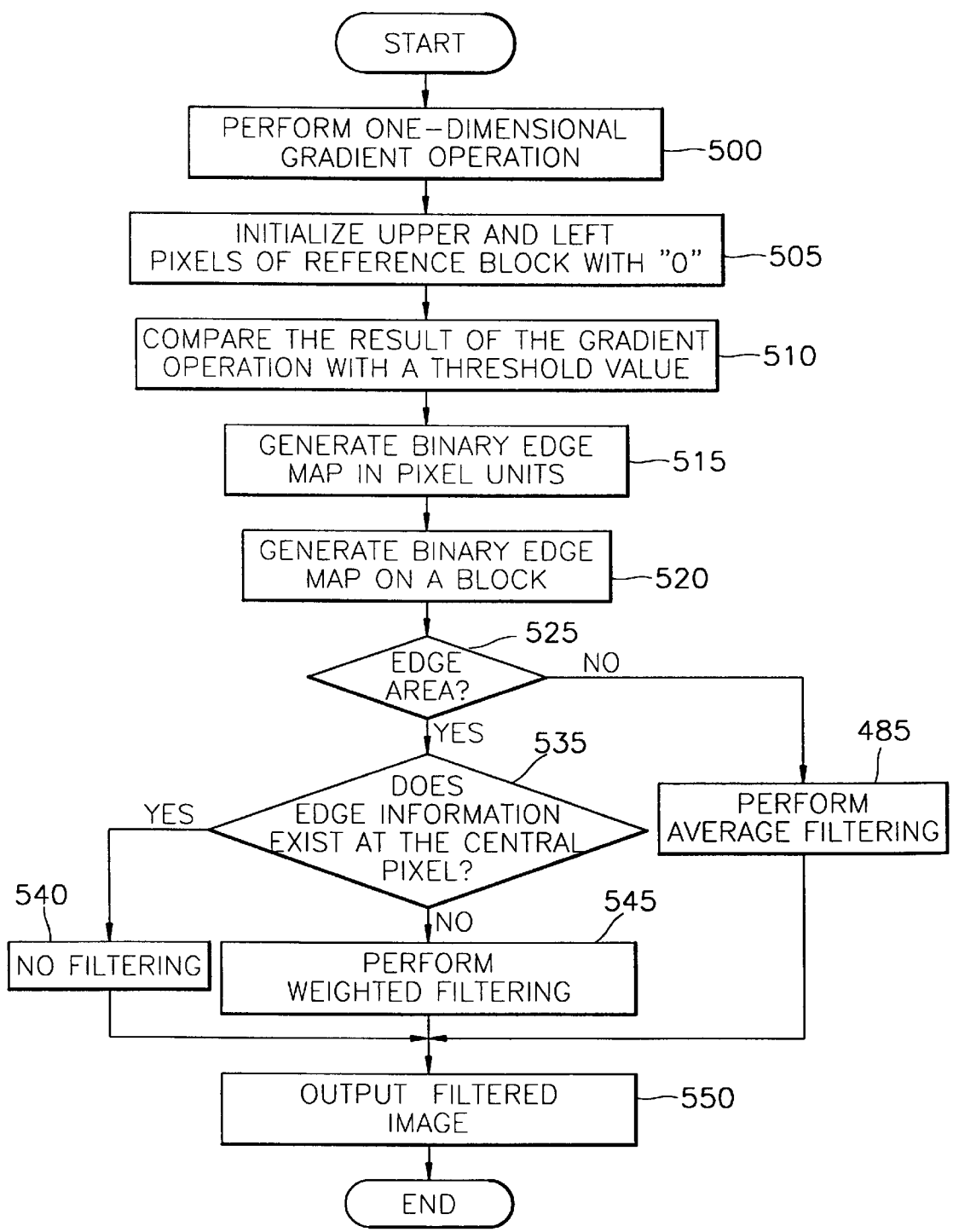
FIG. 5 is a flowchart illustrating a signal adaptive filtering method according to a preferred embodiment of the present invention.

In FIG. 1, a signal adaptive filter according to a preferred embodiment of the present invention includes an image storing unit 100, a gradient operation unit 110, a binary edge map generator 120, a filter selector 130, an average filter 140 and a weighted filter 150. FIG. 5 is a flowchart illustrating a signal adaptive filtering method of the present invention.

The image storing unit 100 temporarily stores a decompressed image data, including ringing noise, which has passed through an inverse source encoding process such as motion estimation and discrete cosine transform (DCT).

The gradient operation unit 110 performs one-dimensional gradient operation in the horizontal and vertical directions on the image data stored in the image storing unit 100 by use of a one-dimensional gradient operator in order to find edge pixels (step 500). Preferably, the one-dimensional gradient operator has weighted values of (1,−1) and includes a horizontal gradient operator in a 1×2 size, used in the gradient operation in the horizontal direction, and a vertical gradient operator in a 2×1 size, used in the gradient operation in the vertical direction.

The binary edge map generator 120 generates binary edge information with respect to a filtering target block. That is, the binary edge map generator 120 compares the absolute value of the gradient-operated result obtained using the one-dimensional horizontal and vertical gradient operators by the gradient operation unit 110, with a predetermined threshold value (step 510), and generates the result as a binary data (step 515). These steps are performed on all pixels of the block in a pixel unit, to generate binary edge map information with respect to the block (step 520).

Figure 2:
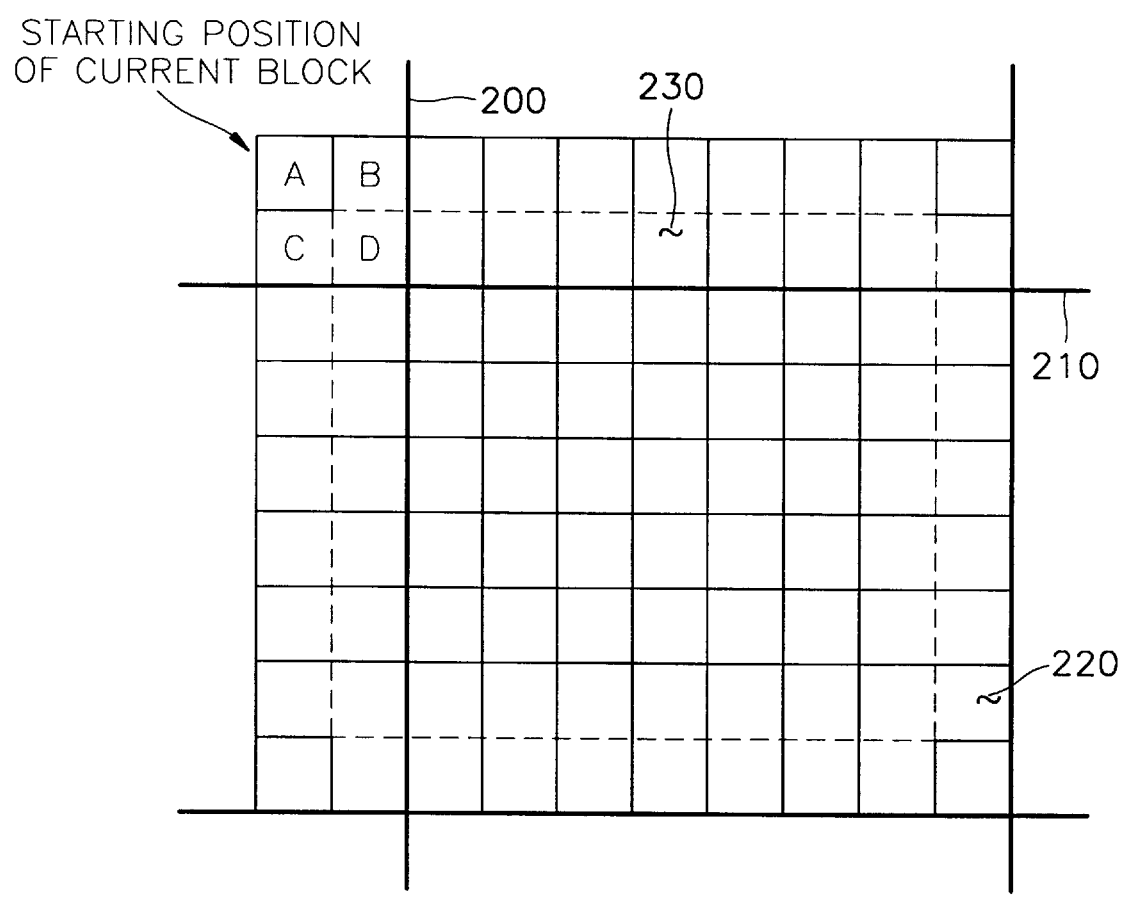
FIG. 2 shows the current block (reference blocks) in an 8×8 pixel size, as a target of filtering.

The operations of the gradient operation unit 110 and the binary edge map generator 120 will be described in detail. FIG. 2 shows the current block (reference block) in an 8×8 pixel size as a filtering target. Here, the bold line 200 represents a vertical block boundary of the reference block, and the bold line 210 represents a horizontal block boundary of the reference block. Also, a block 220 enclosed by the bold lines 200 and 210 represents the reference block as a filtering target, and a block 230 enclosed by dashed lines represents an actual filtering block. Pixels which belong to the reference block 220 but not to the block 230 with the dashed lines are filtered when the next blocks are filtered.

In order to generate binary edge map information with respect to the reference block, upper and left pixels of the dashed line block 230 are initialized to "0" (here "0" means non-edge (step 505). Then, the absolute value of the value calculated using the one-dimensional horizontal gradient operator is compared with a threshold value. Here, the threshold value is set to 19 if a quantization step Q is greater than 19, and to Q if the Q is less than or equal to 19.

According to the result of comparison, if the absolute value is greater than the threshold value, the corresponding pixel and pixel adjacent to the corresponding pixel are determined to correspond to an edge. Otherwise, the adjacent pixel is determined as being a non-edge. Here, the adjacent pixel becomes the right pixel of the corresponding pixel when the gradient operation is performed using the horizontal one-dimensional gradient operator, and the lower pixel of the corresponding pixel when the vertical one-dimensional gradient operator.

On the other hand, the binary edge map information generated by the binary edge map generator 120 is classified into one of an edge area and a homogeneous area. For such classification, the filter selector 130 is used.

The filter selector 130 stores the binary edge map information provided by the binary map generator 120, and selects a filter to be applied to the filtering target pixel. In the present invention, the average filter 140 and the weighted filter 150, which adopt a filter window of 3×3 size, are used. Thus, the filter window used in the filter selector 130 is also of 3×3 size.

The filter selector 130 determines whether a part of the binary edge map in which the filter window is located belongs to an edge area or a homogeneous area based on the edge information within the filter window of 3×3 size (step 525). To be more detail, the filter selector 130 sets a filtering area of the image data of 8×8 size for each pixel by use of the filtering window of 3×3 size. Then, it is checked whether any pixel within the filtering area represents edge information. A filtering area having a pixel representing the edge information is referred to as an "edge area", and a filtering area without the edge information is referred to as a "homogeneous area".

If the filtering area is determined to be an edge area, the filter selector 130 outputs the binary edge map information of the filter window used for the decision and position data of the central pixel in the filter window to the weighted filter 150. Also, the filter selector 130 checks whether the central pixel in the filter represents edge information based on the position data of the central pixel in the filter window (step 535). If the central pixel represents edge information, the pixel value of the original input image data is used as it is without being filtered (step 540). However, if the central pixel does not represent edge information, a weighted filtering is performed for the input image data (step 545). Here, the pixel value of the central pixel in the filter window is replaced by a new value through filtering.

If the filtering area is determined to be the homogeneous area, the filter selector 130 outputs the position data of the central pixel in the filter window to the average filter 140 for an average filtering (step 485).

FIGS. 3A, 3B and 3C relate to a two-dimensional 3×3 filter. In detail, FIG. 3A shows a filter window for a 3×3 filter, FIG. 3B shows weights for a 3×3 average filter, and FIG. 3C shows weights for a 3×3 weighted filter, respectively. In the filter window shown in FIG. 3A, the pixel having an index of "5" represents the central pixel in the filter window. Also, FIG. 4 shows an example of a two-dimensional signal adaptive filter in a 3×3 size.

The average filter 140 and the weighted filter 150, which are two-dimensional low pass filters, will now be described in detail.

When the position data of the central pixel is input, the average filter 140 reads the pixel values required for calculating the filtered pixel value of the central pixel from the image storing unit 100. Then, the average filter 140 calculates the filtered pixel value by use of the read pixel values and the weights shown in FIG. 3B. The calculated filtered pixel value is used as a new pixel value for the central pixel. The weighted filter 150 performs the filtering operation based on the binary edge map information provided from the filter selector 130 and the position data of the central pixel.

The operation of the weighted filter 150 will be described through the following example, for a clearer understanding. If the central pixel of index "5" is an edge pixel, the weighted filter 150 does not perform the filtering operation on the central pixel. If an edge point (or edge points) exists within the 3×3 filter window, but not at the central pixel, the weighted filter 150 performs the filtering operation using the weights shown in FIG. 3C. If edge points are at the points of index 2 and 6, 6 and 8, 4 and 8, or 2 and 4 of FIG. 3A, the weights of the edge points and its outer neighboring point are set to "0". Afterwards, the image data passed through the signal adaptive filtering process are output by the average filter 140 or the weighted filter 150.

On the other hand, during the filtering by the two-dimensional weighted filter 150 of 3×3 size, floating point operation including a floating point may occur, slowing down the calculation speed. To solve this problem, the weighted values (filter coefficients) of the filter can be changed such that the floating point calculation is converted into integer calculation. The conversion into the integer calculation is performed as follows. In the weighted filter shown in FIG. 3C, if the weighted values of the filter are determined, all determined weighted values are summed.

If the sum is equal to 2, the filtering is performed without changing the filter coefficients. If the sum is equal to 3, the weighted value of the central pixel is changed to 5 while the weighted values of the remaining pixels are changed to 3. If the sum is equal to 4, the weighted value of the central pixel is changed to 2 while the weighted values of the remaining pixels are changed to 1. If the sum is equal to 5, the weighted value of the central pixel is changed to 7 while the weighted values of the remaining pixels are changed to 3. If the sum is equal to 6, the weighted value of the central pixel is changed to 4 while the weighted values of the remaining pixels are changed to 3. If the sum is equal to 7, the weighted value of the central pixel is changed to 3 while the weighted values of the remaining pixels are changed to 1. If the sum is equal to 8, the weighted value of the central pixel is changed to 4 while the weighted values of the remaining pixels are changed to 2. If the sum is equal to 9, the weighted value of the central pixel is changed to 11 while the weighted values of the remaining pixels are changed to 3.

From the image data filtered as above, a macroblock of the image data which passed through the signal adaptive filtering is composed again. Then, by repeating the above steps, the signal adaptive filtering on a frame image is achieved (step 550). Here, the size of the blocks to be filtered is not limited to the above embodiment of the present invention.

According to the present invention, the ringing noise is removed from a block-based processed image. Thus, the peak signal-to-noise ratio (PSNR) and the quality of the decompressed image are enhanced.

Although the present invention has been described in terms of a preferred embodiment, it will be appreciated that modifications and changes may be made to the describe embodiment without departing from the spirit and scope of the invention.

What is claimed is:

1. A signal adaptive filtering method for reducing ringing noise in image data, comprising the steps of:
   (a) calculating a gradient of an image data being filtered at each pixel, using a one-dimensional horizontal gradient operator of 1×2 size and a one-dimensional vertical gradient operator of 2×1 size, both having a weighted value (1,−1), and comparing the absolute value of the calculated gradient with a predetermined threshold value to generate a binary value,
   wherein the threshold value of the step (a) is set to a value determined based on a filter window size, if a quantization step Q is greater than the value corresponding to the filter window size, and the threshold value is set equal to Q, if the quantization step Q is less than or equal to the value corresponding to the filter window size;
   (b) repeating said step (a) on a pixel block having a predetermined size by a pixel unit to generate a binary edge map with respect to a whole block;
   (c) applying a filter window of the predetermined size to the generated binary edge map to determine whether edges are present in the filter window;
   (d) filtering the pixel values of the corresponding filter window pixel by pixel by using predetermined first weighted values to generate a new pixel value if it is determined in said step (c) that edges are not present; and
   (e) filtering the pixel values of the corresponding filter window pixel by pixel by using predetermined second weighted values to generate a new pixel value if it is determined in said step (c) that edges are present, wherein no filtering is performed if the pixel located at the center of the filter window represents an edge.

2. The signal adaptive filtering method of claim 1, wherein said step (a) comprises the sub-steps of:
   (a1) initializing upper and left pixels of a filtering target pixel block to information 0 representing a non-edge;
   (a2) comparing the absolute value of the gradient with respect to each pixel of an image with the predetermined threshold value; and
   (a3) determining the corresponding pixel and adjacent pixel as an edge if the absolute value is greater than the threshold value, and as a non-edge if the absolute value is less than or equal to the threshold value, to generate the binary value, wherein said adjacent pixel is a right pixel when using the horizontal gradient operator and said adjacent pixel is a lower pixel when using the vertical gradient operator.

3. The signal adaptive filtering method of claim 1, wherein the filter window is 3×3 in size.

4. The signal adaptive filtering method of claim 1, wherein the value determined based on the filter window size is 19, and the filter window size is 3×3.

5. A signal adaptive filtering method for reducing ringing noise in image data, comprising the steps of:
   (a) calculating a gradient of the image data to be filtered at each pixel using a one-dimensional horizontal gradient operator of 1×2 size and a one-dimensional vertical gradient operator of 2×1 size, both having a weighted value (1−1), and comparing the absolute value of the calculated gradient with a predetermined threshold value to generate a binary value,
   wherein said step (a) further comprises sub-steps of:
   (a1) initializing upper and left pixels of a filtering target pixel block to information 0 representing a non-edge;
   (a2) comparing the absolute value of the gradient with respect to each pixel of an image with the predetermined threshold value; and
   (a3) determining the corresponding pixel and adjacent pixel as an edge if the absolute value is greater than the threshold value, and as a non-edge if the absolute value is less than or equal to the threshold value, to generate the binary value, wherein said adjacent pixel is a right pixel when using the horizontal gradient operator and said adjacent pixel is a lower pixel when using the vertical gradient operator;
   (b) repeating said step (a) on a pixel block having a predetermined size by a pixel unit to generate a binary edge map with respect to a whole block;
   (c) applying a filter window of the predetermined size to the generated binary edge map to determine whether edges are present in the filter window;
   (d) filtering the pixel values of the corresponding filter window pixel by pixel by using predetermined first weighted values to generate a new pixel value if it is determined in said step (c) that edges are not present; and
   (e) filtering the pixel values of the corresponding filter window pixel by pixel by using predetermined second weighted values to generate a new pixel value if it is determined in said step (c) that edges are present, wherein no filtering is performed if the pixel located at the center of the filter window represents an edge.

* * * * *